United States Patent
Thorn

(10) Patent No.: US 11,711,620 B2
(45) Date of Patent: *Jul. 25, 2023

(54) IMAGE CAPTURE DEVICE THAT REDUCES GAPS BETWEEN CAPTURES

(71) Applicant: GoPro, Inc., San Mateo, CA (US)

(72) Inventor: Jonathan Leland Thorn, San Leandro, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/953,029

(22) Filed: Sep. 26, 2022

(65) Prior Publication Data

US 2023/0017212 A1    Jan. 19, 2023

Related U.S. Application Data

(63) Continuation of application No. 17/125,959, filed on Dec. 17, 2020, now Pat. No. 11,470,260.

(51) Int. Cl.
*H04N 23/73* (2023.01)
*G10L 15/24* (2013.01)
*H04N 5/073* (2006.01)

(52) U.S. Cl.
CPC ............. *H04N 23/73* (2023.01); *G10L 15/24* (2013.01); *H04N 5/0736* (2013.01)

(58) Field of Classification Search
CPC ....... H04N 23/73; H04N 5/0736; G10L 15/24
See application file for complete search history.

(56) References Cited

U.S. PATENT DOCUMENTS

| | | | |
|---|---|---|---|
| 11,470,260 B1 | 10/2022 | Thorn | |
| 2007/0217761 A1 | 9/2007 | Chen | |
| 2013/0155255 A1 | 6/2013 | Yu | |
| 2018/0278884 A1 | 9/2018 | Abe | |
| 2019/0012332 A1 | 1/2019 | Newman | |
| 2019/0166306 A1 | 5/2019 | Zen | |
| 2020/0366898 A1 | 11/2020 | Sekiguchi | |
| 2021/0160431 A1 | 5/2021 | Chen | |
| 2021/0360205 A1 | 11/2021 | Alakarhu | |
| 2022/0141517 A1* | 5/2022 | Gratton | H04N 23/631 |
| | | | 386/291 |

* cited by examiner

*Primary Examiner* — Jason A Flohre
(74) *Attorney, Agent, or Firm* — Esplin & Associates, PC

(57) ABSTRACT

After a command to stop recording a video is received, an image capture device may buffer footage in a buffer memory. The buffer memory may be used as a post-capture cache. The footage buffered in the buffer memory may be appended to the end of previously captured footage, appended to the beginning of subsequently captured footage, and/or used to bridge two separately captured footage.

20 Claims, 6 Drawing Sheets

IMAGE CAPTURE DEVICE THAT REDUCES GAPS BETWEEN CAPTURES

FIELD

This disclosure relates to an image capture device that reduces gaps between captures.

BACKGROUND

An image capture device may be used to capture content (e.g., visual content, audio content, video content, data). Capture of content may be prematurely terminated by the user (e.g., the user elects to stop capture, but the action is on-going). Restarting capture by the image capture device may require time, resulting in a gap between separately captured content.

SUMMARY

This disclosure relates to an image capture device that reduces gaps between captures. An image capture device may include a housing. The housing may carry one or more of an image sensor, an optical element, a buffer memory, and/or other components. The optical element may guide light within a field of view to the image sensor. The image sensor may generate a visual output signal conveying visual information based on light that becomes incident thereon. The visual information may define visual content. The buffer memory may provide temporary information storage.

First activation of a trigger to capture the visual content may be detected. Responsive to the first activation of the trigger to capture the visual content, first visual content may be captured based on the visual information conveyed by the visual output signal. Activation of a trigger to stop capture of the visual content may be detected. Responsive to the activation of the trigger to stop capture of the visual content, capture of the first visual content may be stopped and buffer visual content may be captured based on the visual information conveyed by the visual output signal. The buffer visual content may be stored in the buffer memory.

Second activation of the trigger to capture the visual content may be detected. Responsive to the second activation of the trigger to capture the visual content, capture of the buffer visual content may be stopped and second visual content may be captured based on the visual information conveyed by the visual output signal. Combined visual content may be generated based on the first visual content, the buffer visual content, and the second visual content.

An electronic storage may store visual information, information relating to visual content, information relating to buffer memory, information relating to trigger to capture visual content, information relating to trigger to stop capture of visual content, information relating to generation of combined visual content, and/or other information (e.g., metadata, etc.).

The housing may carry one or more components of the image capture device. The housing may carry (be attached to, support, hold, and/or otherwise carry) one or more of an image sensor, an optical element, a buffer memory, a processor, an electronic storage, and/or other components.

The image sensor may be configured to generate a visual output signal and/or other output signals. The visual output signal may be generated by the image sensor based on light that becomes incident thereon. The visual output signal may convey visual information and/or other information. The visual information may define visual content.

The optical element may be configured to guide light within a field of view to the image sensor. The field of view may be less than 180 degrees. The field of view may be equal to 180 degrees. The field of view may be greater than 180 degrees.

The buffer memory may be configured to provide temporary information storage. The buffer memory may be used by the image capture device to temporarily store visual information and/or other information.

The processor(s) may be configured by machine-readable instructions. Executing the machine-readable instructions may cause the processor(s) to facilitate reducing gaps between captures. The machine-readable instructions may include one or more computer program components. The computer program components may include one or more of a trigger component, a capture component, a combining component, and/or other computer program components.

The trigger component may be configured to detect activation of a trigger to start capture stop capture of the visual content. In some implementations, the trigger to start or stop capture of the visual content may be activated based on user interaction with a physical button or a virtual button of the image capture device. In some implementations, the trigger to start or stop capture of the visual content may be activated based on a voice command. In some implementations, the trigger to start or stop capture of the visual content may be activated based motion of the image capture device and/or content captured by the image capture device.

The capture component may be configured to, responsive to activation of the trigger to capture the visual content, capture the visual content. The visual content may be captured based on the visual information conveyed by the visual output signal, and/or other information. For example, responsive to first activation of the trigger to capture the visual content, first visual content may be captured. Responsive to second activation of the trigger to capture the visual content, second visual content may be captured.

The capture component may be configured to, responsive to the activation of the trigger to stop capture of the visual content, stop capture of the visual content and capture buffer visual content. The buffer visual content may be captured based on the visual information conveyed by the visual output signal, and/or other information. The buffer visual content may be stored in the buffer memory.

The capture component may be configured, responsive to the activation of the trigger to capture the visual content during capture of the buffer visual content, stop capture of the buffer visual content and capture the visual content. The visual content may be captured based on the visual information conveyed by the visual output signal, and/or other information. For example, the first visual content may be captured during a first capture duration, the buffer visual content may be captured during a buffer capture duration, and the second visual content may be captured during a second capture duration. The buffer capture duration may follow the first capture duration, and the second capture duration may follow the buffer capture duration.

The combining component may be configured to generate combined visual content. The combined visual content may be generated based on the first visual content, the buffer visual content, the second visual content, and/or other information (e.g. interpolated video frames, etc.). In some implementations, the buffer visual content may provide continuity between the first visual content and the second visual content within the combined visual content.

In some implementations, the combined visual content may be generated further based on the buffer capture duration not exceeding a maximum buffer capture duration and/or other information. In some implementations, the combined visual content may be generated further based on user input to combine the first visual content, the buffer visual content, and the second visual content, and/or other information.

In some implementations, the image capture device may further comprise a display. The display may be configured to visually present information. A buffer capture element may be presented on the display during capture of the buffer visual content. The buffer capture element may indicate capture of the buffer visual content after the activation of the trigger to stop capture of the visual content. In some implementations, the buffer capture element may be removed from presentation on the display based on the trigger to capture the visual content not being activated within the maximum buffer capture duration after the activation of the trigger to stop capture of the visual content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
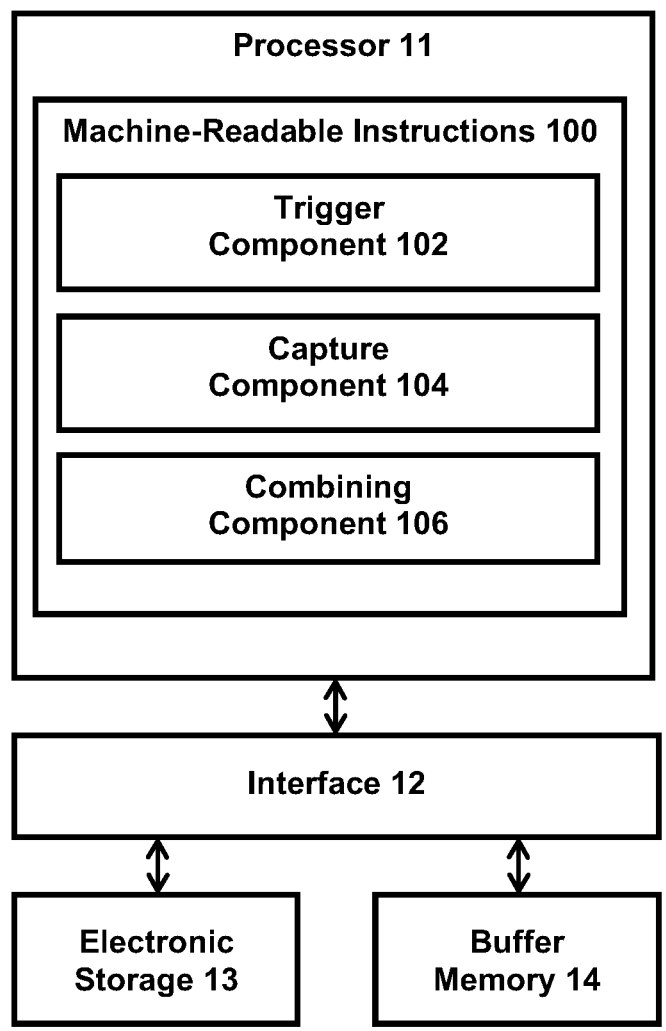
FIG. 1 illustrates an example system that reduces gaps between captures.

FIG. 1 illustrates a system 10 for reducing gaps between captures. The system 10 may include one or more of a processor 11, an interface 12 (e.g., bus, wireless interface), an electronic storage 13, a buffer memory 14, and/or other components. The system 10 may include other components, such as one or more of an optical element, an image sensor, and a display. The system 10 may include and/or be part of an image capture device. The image capture device may include a housing, and one or more of the optical element, the image sensor, the display, and/or other components of the system 10 (e.g., the processor 11, the electronic storage 13, the buffer memory 14) may be carried by the housing the image capture device. The optical element may guide light within a field of view to the image sensor. The image sensor may generate a visual output signal conveying visual information based on light that becomes incident thereon. The visual information may define visual content. The buffer memory 14 may be configured to provide temporary information storage.

First activation of a trigger to capture the visual content may be detected by the processor 11. Responsive to the first activation of the trigger to capture the visual content, first visual content may be captured by the processor 11 based on the visual information conveyed by the visual output signal. Activation of a trigger to stop capture of the visual content may be detected by the processor 11. Responsive to the activation of the trigger to stop capture of the visual content, capture of the first visual content may be stopped by the processor 11 and buffer visual content may be captured by the processor 11 based on the visual information conveyed by the visual output signal. The buffer visual content may be stored in the buffer memory.

Second activation of the trigger to capture the visual content may be detected by the processor 11. Responsive to the second activation of the trigger to capture the visual content, capture of the buffer visual content may be stopped by the processor 11 and second visual content may be captured by the processor 11 based on the visual information conveyed by the visual output signal. Combined visual content may be generated by the processor 11 based on the first visual content, the buffer visual content, and the second visual content.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information, information relating to visual content, information relating to buffer memory, information relating to trigger to capture visual content, information relating to trigger to stop capture of visual content, information relating to generation of combined visual content, and/or other information. While the electronic storage 13 and the buffer memory 14 are shown in FIG. 1 as separate components, this is merely as an example and is not meant to be limiting. In some implementations, the electronic storage 13 and the buffer memory 14 may be separate memory devices. In some implementations, the electronic storage 13 and the buffer memory 14 may be same memory device(s). For example, the buffer memory 14 may be a portion of the electronic storage 13.

Visual content and/or audio content may be captured by an image capture device. Visual content may refer to content of image(s), video frame(s), and/or video(s) that may be consumed visually. Audio content may refer to media content that may be consumed as one or more sounds. Audio content may include one or more sounds stored in one or more formats/containers, and/or other audio content. Audio content may include one or more sounds captured by one or more sound sensors (e.g., microphone). Video content may refer to content of video. Video content may include visual content, audio content, and/or other content.

For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view and/or audio content may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated. Additionally, the frames captured per second in a given duration need not be complete or consistent. Video frames may be interpolated to achieve the appropriate capture duration and corresponding video frames per second as expected for a given time period using temporal re-timing methods (e.g. interpolated frames generated from existing frames, etc.).

Content captured by an image capture device be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). For example, information defining visual content (visual information) may be stored within a single file or multiple files. Visual information defining an image or video frames of a video may be stored within a single file (e.g., image file, video file), multiple files (e.g., multiple image files, multiple video files), a combination of different files, and/or other files.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the optical element, the image sensor, the display, the buffer memory 14, and/or other components of the system 10 may be carried by the housing of the image capture device.

Figure 3:
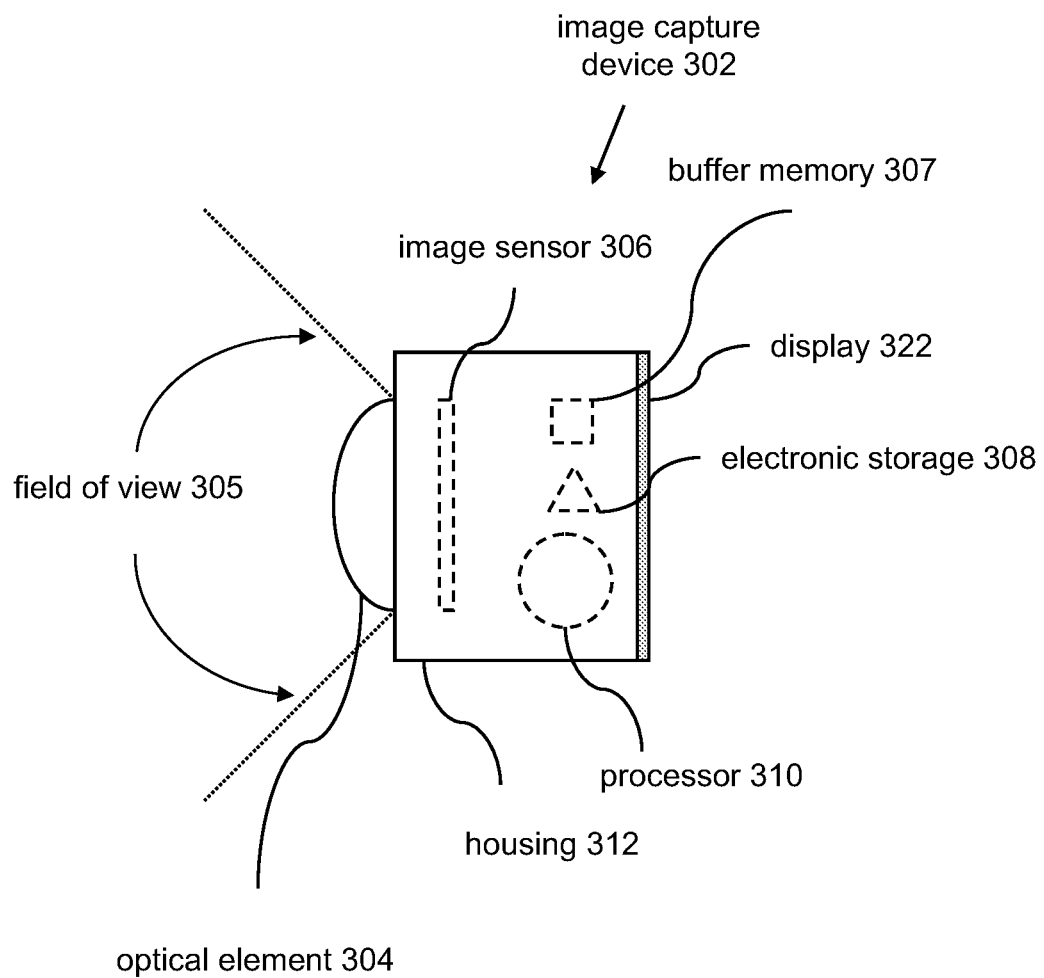
FIG. 3 illustrates an example image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet). FIG. 3 illustrates an example image capture device 302. Visual content (e.g., of image(s), video frame(s)) may be captured by the image capture device 302. The image capture device 302 may include a housing 312. The housing 312 may refer a device (e.g., casing, shell) that covers, protects, and/or supports one or more components of the image capture device 302. The housing 312 may include a single-piece housing or a multi-piece housing. The housing 312 may carry (be attached to, support, hold, and/or otherwise carry) one or more of an optical element 304, an image sensor 306, a buffer memory 307, an electronic storage 308, a display 309, a processor 310, and/or other components. In some implementations, the buffer memory 307 may be part of the electronic storage 308.

One or more components of the image capture device 302 may be the same as, be similar to, and/or correspond to one or more components of the system 10. For example, the buffer memory 307 may be the same as, be similar to, and/or correspond to the buffer memory 14. The electronic storage 308 may be the same as, be similar to, and/or correspond to the electronic storage 13. The processor 310 may be the same as, be similar to, and/or correspond to the processor 11. The image capture device 302 may include other components not shown in FIG. 3, such as one or more sound sensors. The sound sensor(s) may be used by the image capture device 302 to capture audio content. The image capture device 302 may not include one or more components shown in FIG. 3. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be less than 180-degrees. In some implementations, the field of view 305 may be equal to 180-degrees.

In some implementations, the image capture device 302 may include multiple optical elements. For example, the image capture device 302 may include multiple optical elements that are arranged on the housing 312 to capture spherical images/videos (guide light within spherical field of view to one or more images sensors). For instance, the image capture device 302 may include two optical elements positioned on opposing sides of the housing 312. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating video content (e.g., content of video frames). For example, during a capture duration, the visual output signal generated by the image sensor 306 and/or the visual information conveyed by the visual output signal may be used to record, store, and/or otherwise capture the visual content for use in generating video content. Video content may include other content captured by the image capture device 302, such as audio content captured by the image capture device.

In some implementations, the image capture device 302 may include multiple image sensors. For example, the image capture device 302 may include multiple image sensors carried by the housing 312 to capture spherical images/videos based on light guided thereto by multiple optical elements. For instance, the image capture device 302 may include two image sensors configured to receive light from two optical elements positioned on opposing sides of the housing 312. The fields of views of the optical elements may overlap and enable capture of spherical images and/or spherical videos.

The buffer memory 307 may be configured to provide temporary information storage. The buffer memory 307 may include one or more memory devices and/or one or more portions of memory device(s) that are set aside as a temporary holding place for data, such as the visual information conveyed by the visual output signal of the image sensor 306. The buffer memory 307 may be used by the image capture device 302 to temporarily store visual information and/or other information. In some implementations, the buffer memory 307 may be used by the image capture device 302 to temporarily store information (audio information) defining audio content captured by the image capture device 302. In some implementations, the buffer memory 307 may include one or more circular buffers.

The buffer memory 307 may be used as a post-capture cache. The image capture device 302 may be capturing content, and may detect a trigger to stop capture of the content. Responsive to detection of the trigger to stop capture of the content, the image capture device 302 may continue to capture content, but rather than extending previously captured content, may temporarily store the content in the buffer memory 307. Temporarily stored content may be appended to the end of previously captured content, appended to the beginning of subsequently captured content, and/or used to bridge two separately captured content.

For example, while the image capture device 302 is capturing visual content, the image capture device 302 may detect a trigger to stop capture of the visual content. The image capture device 302 may continue to capture visual content, but may not automatically append the post-trigger captured visual content to the previously captured visual content. Rather, the visual content captured after the detection of the trigger may be temporarily stored in the buffer memory 307. For instance, as the image sensor 306 converts received light into visual information defining visual content, the visual information may be temporarily stored in the buffer memory 307. The visual content temporarily stored in the buffer memory 307 may be used to extend visual content (e.g., extend duration of visual content) captured by image capture device 302. The visual content may be stored in the buffer memory 307 to potentially be included within visual content permanently stored/output by the image capture device 302. The visual content may be stored in the buffer memory 307 to potentially be included within encoding of visual content. Temporarily stored visual content may be appended to the end of previously captured visual content, appended to the beginning of subsequently captured visual content, and/or used to bridge two separately captured visual content.

The display 309 may refer to an electronic device that provides visual presentation of information. The display 309 may include a color display and/or a non-color display. In some implementations, the display 309 may include one or more touchscreen displays. The display 309 may be configured to visually present information. The display 309 may be configured to present visual content, user interface, user interface elements, and/or other information. User interface (graphical user interface) may include a graphical form that enables a user to interact with the image capture device 302 and/or see information provided by the image capture device 302. User interface elements may refer to components of the user interface. User interface elements may refer to graphical elements of the user interface, such as windows, icons, buttons, graphics, and/or other visual indicators. User interface elements may visually provide information and/or enable a user to provide inputs to the image capture device 302 (by interacting with the user interface elements).

While the image capture device 302 is shown as having one display, this is merely as an example and is not meant to be limiting. In some implementations, the image capture device may include multiple displays. For example, the image capture device 302 may include a rear-facing display (e.g., the display 309) and a front-facing display. The front-facing display may enable a user to see visual content being captured by the image capture device 302, the user interface, the user interface elements, and/or other information while the image capture device is pointed towards the user.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or other sensors (e.g., audio sensor). The processor 310 may facilitate transfer of information from the image sensor 306 and/or other sensors to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

Responsive to detection of activation of a trigger to start capturing content, (e.g., visual content, audio content, video content), the image capture device 302 may start capture of the content. Responsive to detection of activation of a trigger to stop capturing the content, the image capture device 302 may stop capture of the content and instead start capturing buffer content. Buffer content may refer to content that is captured by the image capture device after detection of activation of the trigger to stop capture of the content. Buffer content may refer to content that is temporarily stored in the buffer memory 307. Buffer content may refer to content that is captured by the image capture device for potentially being appended (e.g., joined with, added to) to other content.

The image capture device 302 may temporarily store, in the buffer memory 307, buffer content (e.g., buffer visual content, buffer audio content, buffer video content) captured by the image capture device 302 after detection of a trigger to stop capture of the content. The buffer content stored in the buffer memory 307 may be used as post-capture cached content. Capture and storage of the buffer content may enable uninterrupted rapid sequential capture via trailing cache encoding. Capture and storage of the buffer content may provide a "safety net" for users who stops content capture prematurely/starts content capture too late and provide content that would have otherwise not been captured.

In some implementations, the image capture device 302 may capture and temporarily store buffer content based on the image capture device 302 operating in a buffering mode. In some implementations, the buffering mode may be activated/deactivated by a user. In some implementations, the buffering mode may be activated/deactivated automatically by the image capture device 302.

In some implementations, the activation of the buffering mode may change behavior of the image capture device 302. For example, the image capture device 302 may have a fast-capture button. The fast capture button may be used to both power-on and capture content/power-down and stop capture of content. For instance, activation of the fast capture button while the image capture device 302 is powered down may cause the image capture device 302 to power on and start capturing (e.g., recording) content. Activation of the fast capture button while the image capture device 302 is capturing content may cause the image capture device 302 to stop capturing content and to power down. Such operation of the image capture device 302 may result in a user not being able to rapidly restart capture of content. That is, once the image capture device 302 powers down, the user may need to wait for the image capture device to power on again before capture is restarted. For example, powering down may take 2.5 seconds and powering up may take 2.5 seconds. Such duration of powering down/up may result in capture of content missing 5 seconds if a user activates trigger to capture content immediately after activating trigger to stop capture of content.

Based on the buffering mode being activated, use of the fast capture button while the image capture device 302 is capturing content may not cause the image capture device 302 to power down. Based on the buffering mode being activated, use of the fast capture button while the image capture device 302 is capturing content may cause the image capture device 302 to capture buffer content. Capture of the buffer content may enable back-to-back fast-captures without interruption of the capture flow. Capture of the buffer content may overcome perception that fast-captures prevent capture of content in rapid succession. In some implementations, the image capture device 302 may enter idle/sleep state rather than powering down, causing the image capture device 302 to be in standby for encoding (warm boot).

Referring back to FIG. 1, the processor 11 (or one or more components of the processor 11) may be configured to obtain information to facilitate detecting hand obstructions. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate reducing gaps between captures. The machine-readable instructions 100 may include one or more computer program components. The machine-readable instructions 100 may include one or more of a trigger component 102, a capture component 104, a combining component 106, and/or other computer program components.

The trigger component 102 may be configured to detect activation of a trigger to capture content (e.g., visual content, audio content, video content)/start capture of content. Activation of the trigger may indicate to the image capture device that content is to be captured (e.g., for use in generating video content)/content capture is to be started. For example, activation of the trigger may indicate to the image capture device that the visual content observed by the image sensor is to be converted, recorded, encoded, and/or otherwise captured for inclusion in a video. Activation of the trigger may indicate to the image capture device that other content, such as audio content and/or metadata for the video, is to be captured.

A trigger to capture content may include a thing, an event, a situation, and/or a condition that initiates the image capture device to convert, record, store, encode, and/or otherwise capture content. For example, a trigger to capture content may include a thing, an event, a situation, and/or a condition that initiates the image capture device to convert, record, store, encode, and/or otherwise capture visual content, audio content, and/or video content for inclusion in video.

The trigger component 102 may be configured to detect activation of a trigger to stop capture of content. Activation of the trigger may indicate to the image capture device that current capture of content is to be stopped. For example, activation of the trigger may indicate to the image capture device that current capture of visual content for inclusion in a video is to be stopped. Activation of the trigger may indicate to the image capture device that capture of other content, such as audio content and/or metadata for the video, is to be stopped.

A trigger to stop capture of content may include a thing, an event, a situation, and/or a condition that initiates the image capture device to stop converting, recording, storing, encoding, and/or otherwise capturing content. For example, a trigger to stop capture of content may include a thing, an event, a situation, and/or a condition that initiates the image capture device to stop converting, recording, storing, encoding, and/or otherwise capturing visual content, audio content, and/or video content for inclusion in video.

A trigger may refer to one or more hardware components of the image capture device/device in communication with the image capture device, one or more software components of the image capture device/device in communication with the image capture device, one or more particular ways in which the image capture device/device in communication with the image capture device is being used, and/or other thing(s), event(s), situation(s), and/or condition(s). The trigger to capture content/stop capture of content may be received at the image capture device and/or other device(s) in communication with the image capture device (e.g., a smartphone/tablet controlling operation of the image capture device).

Activation of a trigger may refer to action or process of making the trigger active or operative. Activation of a trigger may refer to occurrence and/or usage of the trigger. Activation of a trigger may refer to one or more of usage of a thing, occurrence of an event, occurrence of a situation, and/or occurrence of a condition. For example, activation of a trigger may include one or more of usage of hardware component(s) of the image capture device, usage of software component(s) of the image capture device, occurrence in which the image capture device is being used in particular way(s), and/or usage of other thing(s)/occurrence of other event(s)/situation(s)/condition(s). Activation of a trigger may provide one or more commands to the image capture device to start/stop capture of content.

Activation of a trigger may be detected based on monitoring of the trigger. Activation of a trigger may be detected based on monitoring of the usage of the trigger and/or occurrence of the trigger. For example, activation of a trigger may be detected based on monitoring of one or more of usage of a thing, occurrence of an event, occurrence of a situation, and/or occurrence of a condition. Monitoring of a trigger may be performed based on observation and/or checking of information that characterizes usage and/or occurrence of the trigger. Activation of a trigger may be detected based on provision of one or more commands to the image capture device to capture content for use in generating a video. Other triggers, activations of triggers, and detection of activations of triggers are contemplated.

In some implementations, the trigger to capture content/stop capture of content may be activated based on user interaction with one or more buttons (e.g., a physical button, a virtual button) of the image capture device. User interaction with a button may include one or more of pressing the button, pulling the button, twisting the button, flipping the button, and/or other interaction with the button. A button may include a physical button, a virtual button, and/or other types of button. A physical button (hard button) may refer to a physical component of the image capture device that may be interacted upon by a user. A virtual button (soft button) may refer to a virtual component of the image capture device (e.g., presented on a touchscreen display) that may be interacted upon by a user. A virtual button may correspond to one or more user interface elements presented on the touchscreen display (e.g., record/shutter button icon).

A button may include a button with a function dedicated to capturing/stop capturing content (e.g., visual content, audio content, video content), such as a record button and/or a shutter button. A button may include a multi-function button with one or more of its functions dedicated to capturing/stop capturing content. A button may include a variable function button with its operative function changing based on user selection, image capture mode operation, and/or other information. The operative function of the button may include prompting the image capture device to capture/stop capture content.

In some implementations, the trigger to capture content/stop capture of content may be activated based on one or more voice commands, one or more motion of the image capture device, one or more content (e.g., visual content, audio content, video content) captured by the image capture device, and/or other information. A voice command may refer to one or more words, phrases, sounds, and/or other audible commands that is associated with capturing/stop capturing content. A voice command may be recorded and/or detected by one or more sound sensors, such as a sound sensor of the image capture device. A voice command may cause the image capture device to start/stop capturing content.

The motion of an image capture device (as obtained via inertial measurement units such as accelerometers, gyroscopes, etc.) may refer to translational movement of the image capture device, rotational movement of the image capture device (e.g. yaw, pitch, roll, etc.), direction of movement of the image capture device e.g. vector, etc.), speed of the image capture device (e.g. mph, m/s, etc.), acceleration of the image capture device (e.g. $m/s^2$, etc.), and/or other movement of the image capture device. Particular motion of the image capture device be associated with start/stop capturing content. Particular motion of the image capture device may cause the image capture device to start/stop capturing content.

Content captured by the image capture device may be analyzed to detect the trigger to capture content/stop capture of content. Analysis of content captured by an image capture device may include analysis of visual content, audio content, and/or other content captured by the image capture device. Analysis of visual content may include examination of one or more visual features/characteristics of the visual content. In some implementations, analysis of visual content may include detection of content within the visual content. Visual content detection may include identification of things within the visual content (e.g., face recognition, object recognition, scene recognition, emotion recognition), the quality and/or number of things within the visual content (e.g., number of faces, number of objects, level of emotion, amount of motion), and/or other features/characteristics relating to things depicted within the visual content. Analysis of audio content may include examination of one or more audio features/characteristics of the audio content. In some implementations, analysis of audio content may include detection of content within the audio content. Audio content detection may include identification of particular audio within the audio content (e.g., voice command, sound), the quality of audio within the visual content (e.g., energy, clarity), and/or other features/characteristics relating to audio captured within the audio content.

For example, the image capture device may start/stop capturing content based on detection of particular objects (e.g., persons, faces), and/or detection of motion within the visual content. As another example, the image capture device may start/stop capturing content based on the amount and/or type of motion detected within the visual content.

In some implementations, other information may be used to detect occurrences of events of interest. For example, location of the image capture device, motion of the image capture device, and/or other metadata/telemetry associated with the image capture device may be used to detect occurrences of events of interest. Detection of occurrences of events of interest may be used to start/stop capture of content.

The capture component 104 may be configured to, responsive to activation of the trigger to capture content (e.g., visual content, audio content, video content), capture the content. Responsive to activation of the trigger to start capturing content, the capture component 104 may start capture of the content. Activation of the trigger may provide one or more commands to the image capture device to capture content/start capture of content for inclusion in a video. Based on the trigger to start capture of content being activated, the image capture device may start collection of content (e.g., visual content, audio content, data) in the electronic storage (e.g., removable SD card, microSD card, etc. or built-in storage such as SSD, eMMC, etc.).

For example, responsive to activation of the trigger to capture visual content, the capture component 104 may be configured to capture the visual content. The visual content may be captured based on the visual information conveyed by the visual output signal, and/or other information. Responsive to separate activation of the trigger to capture the visual content, separate visual content may be captured. For example, responsive to first activation of the trigger to capture the visual content, first visual content may be captured. Responsive to second activation of the trigger to capture the visual content, second visual content may be captured.

The visual content may be captured through one or more optical elements. The visual content may be captured during a capture duration. The length of the capture duration may depend on activation of the trigger to capture visual content and activation of the trigger to stop capturing visual content. For instance, the length of the capture duration may span from the time activation of the trigger to capture visual content is detected and the time activation of the trigger to stop capturing visual content is detected. Capturing visual content during a capture duration may include recording, storing, and/or otherwise capturing the visual content during the capture duration. The visual content may be captured for use in generating images and/or video frames.

For example, during a capture duration, the capture component 102 may use the visual output signal generated by an image sensor and/or the visual information conveyed by the visual output signal to record, store, and/or otherwise capture the visual content. For instance, the capture component 102 may store, in the electronic storage 13 and/or other (permanent and/or temporary) electronic storage medium, information (e.g., the visual information) defining the visual content based on the visual output signal generated by the image sensor and/or the visual information conveyed by the visual output signal during the capture duration. In some implementations, information defining the captured visual content may be stored in one or more visual tracks.

The capture component 104 may be configured to, responsive to the activation of the trigger to stop capture of content (e.g., visual content, audio content, video content), stop capture of the content. The capture component 104 may be configured to, responsive to the activation of the trigger to stop capture of content, capture buffer content (e.g., buffer visual content, buffer audio content, buffer video content). That is, when the trigger to stop capture content is activated while content is being captured, the capture component 104 may switch from capturing the content to capturing the buffer content. Activation of the trigger to stop capture of content may cause the capture component 104 to stop current capture of content while starting capture of buffer content.

The buffer content may be stored in the buffer memory 14. The buffer content may be temporarily stored in the buffer memory 14 for potential use in generating video content. Activation of the trigger may provide one or more commands to the image capture device to stop capturing content and start buffering content (for potential inclusion in a video). Based on the trigger to stop capture of content being activated, the image capture device may stop the collection of content in the electronic storage while buffering the content. The content may be buffered for use in the event the trigger to start capture of content is activated while the image capture device is buffering content. The image capture device may store the buffered content in buffer memory (e.g., RAM, etc.).

For example, while the visual content is being captured, the activation of the trigger to stop capturing visual content may be detected. Responsive to the activation of the trigger to stop capture of the visual content, the capture of the visual content may be stopped, and capture of the buffer visual content may be started. The buffer visual content may be captured based on the visual information conveyed by the visual output signal, and/or other information.

The buffer visual content may be captured through one or more optical elements. The buffer visual content may be captured during a buffer capture duration. The length of the buffer capture duration may depend on activation of the trigger to stop capture visual content and activation of the trigger to capture visual content. For instance, the length of the buffer capture duration may span from the time activation of the trigger to stop capture visual content is detected and the time activation of the trigger to start capturing visual content is detected. In some implementations, the length of the buffer capture duration may depend on the type of trigger that activated capture of buffer visual content. For example, the length of the buffer capture duration for buffer visual content captured based on a button press may be different from the length of the buffer capture duration for buffer visual content captured based on image capture device motion and/or voice command. The length of the buffer capture duration for buffer visual content captured based on one voice command may be different from the length of the buffer capture duration for buffer visual content captured based on a different voice command. The length of the buffer capture duration for buffer visual content captured based on one motion of the image capture device may be different from the length of the buffer capture duration for buffer visual content captured based on a different motion of the image capture. Capturing buffer visual content during a buffer capture duration may include recording, storing, and/or otherwise capturing the buffer visual content during the buffer capture duration. The buffer visual content may be captured for potential use in generating images and/or video frames of a video.

For example, during a buffer capture duration, the capture component 102 may use the visual output signal generated by an image sensor and/or the visual information conveyed by the visual output signal to record, store, and/or otherwise capture the buffer visual content. For instance, the capture component 102 may store, in the buffer memory 14 and/or other (permanent and/or temporary) electronic storage medium, information (e.g., the visual information) defining the buffer visual content based on the visual output signal generated by the image sensor and/or the visual information conveyed by the visual output signal during the buffer capture duration. In some implementations, the buffer visual content may be stored as individual images/video frames. The buffer visual content may not be encoded into a video. The individual images/video frames of the buffer visual content may be encoded when they are selected for inclusion in a video.

In some implementations, the image capture device may further comprise one or more displays. In some implementations, the display(s) may include a touchscreen display. The display(s) may be configured to visually present information. A buffer capture element may be presented on a display during capture of the buffer content (e.g., buffer visual content, buffer audio content, buffer video content). The buffer capture element may refer to an interface element that visually indicates capture of buffer content after activation of the trigger to stop capture of content. For example, the buffer capture element may indicate capture of the buffer visual content after the activation of the trigger to stop capture of the visual content. In some implementations, the buffer capture element may visually indicate the amount of buffer content captured and/or stored in the buffer memory 14. The buffered-amount element may include one or more graphical elements, such as windows, icons, buttons, graphics, and/or other visual indicators, that visually provide information on how much buffer content has been captured and/or stored in the buffer memory 14.

In some implementations, the buffer capture element may be removed from presentation on the display based on the trigger to capture the content (e.g., visual content, audio content, video content) not being activated within a maximum buffer capture duration after the activation of the trigger to stop capture of the content. Maximum buffer capture duration may refer to maximum length during which buffer content may be captured. The maximum buffer capture duration may correspond to maximum amount of buffer content that may be stored in the buffer memory 14.

If the trigger to capture content is not activated within the maximum buffer capture duration after buffer content capture is started, the capture of the buffer content may be stopped. Once the space allotted for the buffer content in the buffer memory 14 is filled with captured buffer content, the capture of the buffer content may be stopped. The buffer capture element may be removed from presentation on the display to indicate that the image capture device is no longer capturing buffer content.

The capture component 104 may be configured, responsive to the activation of the trigger to capture content (e.g., visual content, audio content, video content) during capture of the buffer content, stop capture of the buffer content and capture the content. That is, when the trigger to capture content is activated while buffer content is being captured, the capture component 104 may switch from capturing the buffer content to capturing the content. Activation of the trigger to capture of content while buffering content may cause the capture component 104 to stop capture of buffer content while starting capture of content.

For example, while buffer visual content is being captured, the activation of the trigger to capture visual content may be detected. Responsive to the activation of the trigger to capture of the visual content, the capture of the buffer visual content may be stopped, and capture of the visual content may be started. The visual content may be captured based on the visual information conveyed by the visual output signal, and/or other information.

Figure 4:
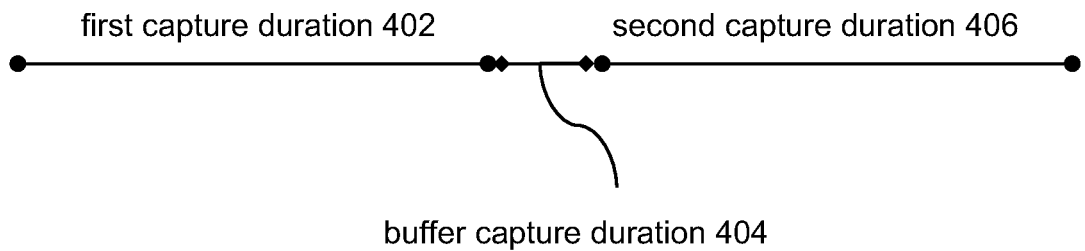
FIG. 4 illustrates example capture durations.

The content and the buffer content may be captured during same or different capture duration. FIG. 4 illustrates example capture durations. As shown in FIG. 4, an image capture device may capture visual content (e.g., first visual content) during a first capture duration 402. The first capture duration 402 may stop when a trigger to stop capture of the visual content is activated. The activation of the trigger to stop capture of the visual content may cause the image capture device to capture buffer visual content. The image capture device may capture buffer visual content during a buffer capture duration 404. The activation of the trigger to start capture of the visual content may cause the image capture device to stop capture of the buffer visual content and start capture of another visual content (e.g., second visual content). The other visual content may be captured during a second capture duration 406. The buffer capture duration 404 may follow the first capture duration 402. The second capture duration 106 may follow the buffer capture duration 404. Other capture durations are contemplated.

The combining component 106 may be configured to generate combined content (e.g., combined visual content, combined audio content combined video content). Combined content may refer to combination of separately captured content. Combined content may refer to combination of separate content captured over separate capture durations. Combined content may refer to content that includes regularly captured content (content captured based on activation of trigger to capture content) and buffer content. For example, the combined content may be generated based on the content captured before capture of the buffer content, the buffer content, the content captured after capture of the buffer content, and/or other information. The combined content may be generated by appending the buffer content to the end of the content captured before capture of the buffer content. The combined content may be generated by appending the buffer content to the start of the content captured after capture of the buffer content. The combined content may be generated by bridging, with the buffer content, the content captured before capture of the buffer content and the content captured after capture of the buffer content. That is, the buffer content may be used to bridge (join together) the content captured before capture of the buffer content and the content captured after capture of the buffer content.

For instance, an image capture device may capture first visual content, then buffer visual content, and then second visual content. The buffer visual content may be appended to the end of the first visual content, appended to the start of the second visual content, and/or used to bridge the first visual content to the second visual content. The buffer visual content may provide continuity between the first visual content and the second visual content within the combined visual content so that no break appears within the combined visual content. That is, using the buffer visual content to join the first visual content and the second visual content may make the combined visual content appear to have been captured over a longer period of time without any stop in capture.

The combined visual content may be generated as encoded visual content and/or as instructions for rending the visual content. For example, the combined visual content may be generated as an encoded version of a particular video clip, and the video clip may be opened in a video player for played on the display(s). The images/video frames containing the buffer visual content, along with the images/video frames containing other visual content, may be included/used in encoding of the images/video frames of the video. The images/video frames in the buffer memory 14 may be encoded/cache encoded when generating the combined visual content. As another example, the combined visual content may be generated as instructions identifying which visual content (e.g., first visual content, buffer visual content, second visual content) and the ordering of the visual content to be included within a presentation of the combined visual content. A video player may use the instructions to retrieve the video content identified in the instructions for presentation in accordance with the ordering of the video content when the combined visual content is to be played.

Figure 5A:
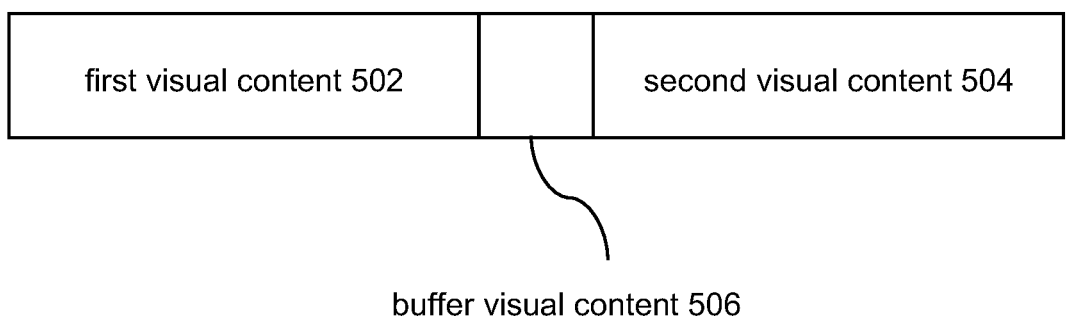
FIGS. 5A, 5B, and 5C illustrate example combination of visual content.
Figure 5B:
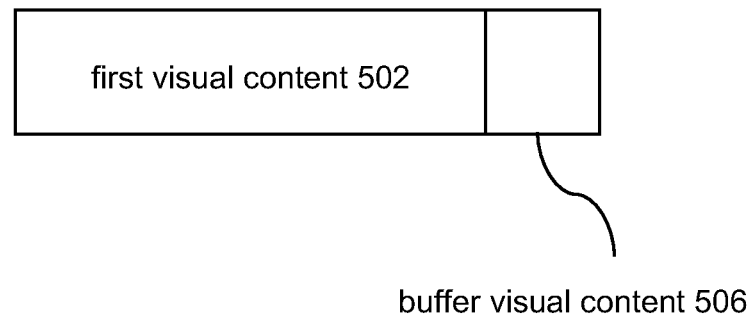
Figure 5C:
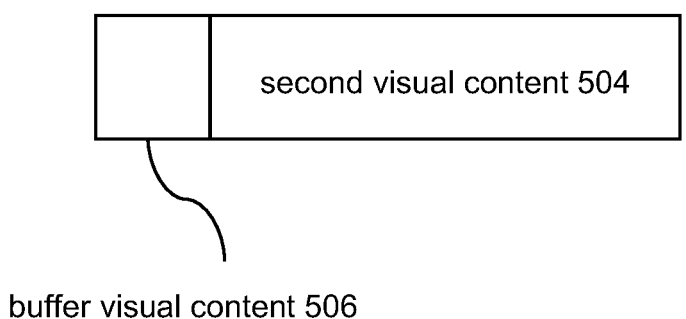

FIGS. 5A, 5B, and 5C illustrate example combination of visual content. In FIG. 5A, combined visual content 510 may be generated to include first visual content 502, second visual content 504, and buffer visual content 506. The buffer visual content 506 may be captured between capture of the first visual content 502 and the second visual content 504. The buffer visual content 506 may bridge the gap between the first visual content 502 and the second visual content 504 to produce long visual content without temporal gap.

In FIG. 5B, combined visual content 520 may be generated to include the first visual content 502 and the buffer visual content 506. The buffer visual content 506 may be appended to the end of the first visual content 502. The buffer visual content 506 may extend the length of the combined visual content 520 so that the combined visual content 520 appears to have been captured over a single long duration. The combined visual content 520 may appear to be the same as if the capture of the first visual content 502 was stopped later. The buffer visual content 506 may provide a post-capture footage for the combined visual content 520.

In FIG. 5C, combined visual content 530 may be generated to include the second visual content 504 and the buffer visual content 506. The buffer visual content 506 may be appended to the start of the second visual content 504. The buffer visual content 506 may extend the length of the combined visual content 530 so that the combined visual content 530 appears to have been captured over a single long duration. The combined visual content 530 may appear to be the same as if the capture of the second visual content 504 was started earlier. The buffer visual content 506 may provide a pre-capture footage for the combined visual content 530.

In some implementations, the combined visual content may be generated further based on the buffer capture duration not exceeding a maximum buffer capture duration and/or other information. The maximum buffer capture duration may refer to maximum length during which buffer visual content may be captured. The combined visual content may be generated to include the buffer visual content at the end or middle of the combined visual content based on the buffer capture duration not exceeding the maximum buffer capture duration. Such requirement may ensure that the combined visual content does not include gaps.

Figure 6A:
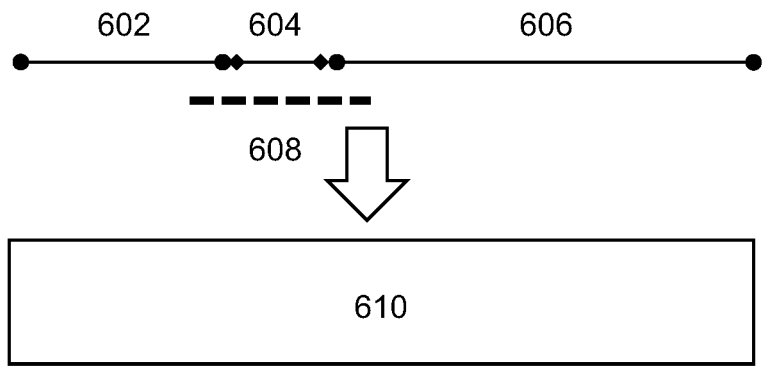
FIG. 6A illustrate example combination of visual content.

FIG. 6A illustrate example combination of visual content. In FIG. 6A, first visual content may be captured during a first capture duration 602, buffer visual content may be captured during a buffer capture duration 604, and second visual content may be captured during a second capture duration 606. The buffer capture duration 604 may be shorter than a maximum buffer capture duration 608. Responsive to the buffer capture duration 604 not exceeding the maximum buffer capture duration 608, combined visual content 610 may (automatically) be generated to include the first visual content, the buffer visual content, and the second visual content. The combined visual content 610 may be output as a single video clip.

Figure 6B:
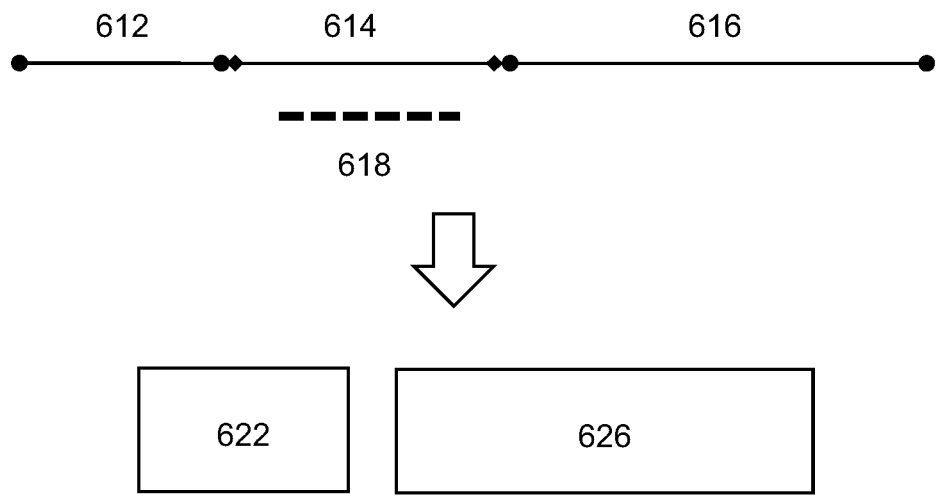
FIG. 6B illustrate example non-combination of visual content.

FIG. 6B illustrate example non-combination of visual content. In FIG. 6B, first visual content may be captured during a first capture duration 612, buffer visual content may be captured during a buffer capture duration 614, and second visual content may be captured during a second capture duration 616. The buffer capture duration 614 may be longer than a maximum buffer capture duration 618. Responsive to the buffer capture duration 614 exceeding the maximum buffer capture duration 618, combined visual content may not be generated. Instead, the first visual content and the second visual content may be output as separate visual content (e.g., separate video clips).

In some implementations, the combined content (e.g., combined visual content, combined audio content, combined video content) may be generated further based on user input to combine the buffer content with other content. For example, the combined visual content may be generated with the buffer visual content appended to the end of the first visual content based on user input to combine the buffer visual content with the first visual content. The combined visual content may be generated with the buffer visual content appended to the start of the second visual content based on user input to combine the buffer visual content with second first visual content. The combined visual content may be generated with the buffer visual content joining the first visual content and the second visual content based on user input to combine the first visual content, the buffer visual content, and the second visual content.

The user input to combine the buffer content with other content may not need to include information on ordering of the content to be combined. Instead, the buffer content may be automatically placed (e.g., in front of, at the end of, in the middle of) with respect to the other content based on whether the user input has selected the content captured before the buffer visual content and/or the content captured after the buffer visual content as the other content to be combined with the buffer visual content. In some implementations, whether the selected content was captured before and/or after the buffer visual content may be determined based on time associated with/capture time of the selected content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
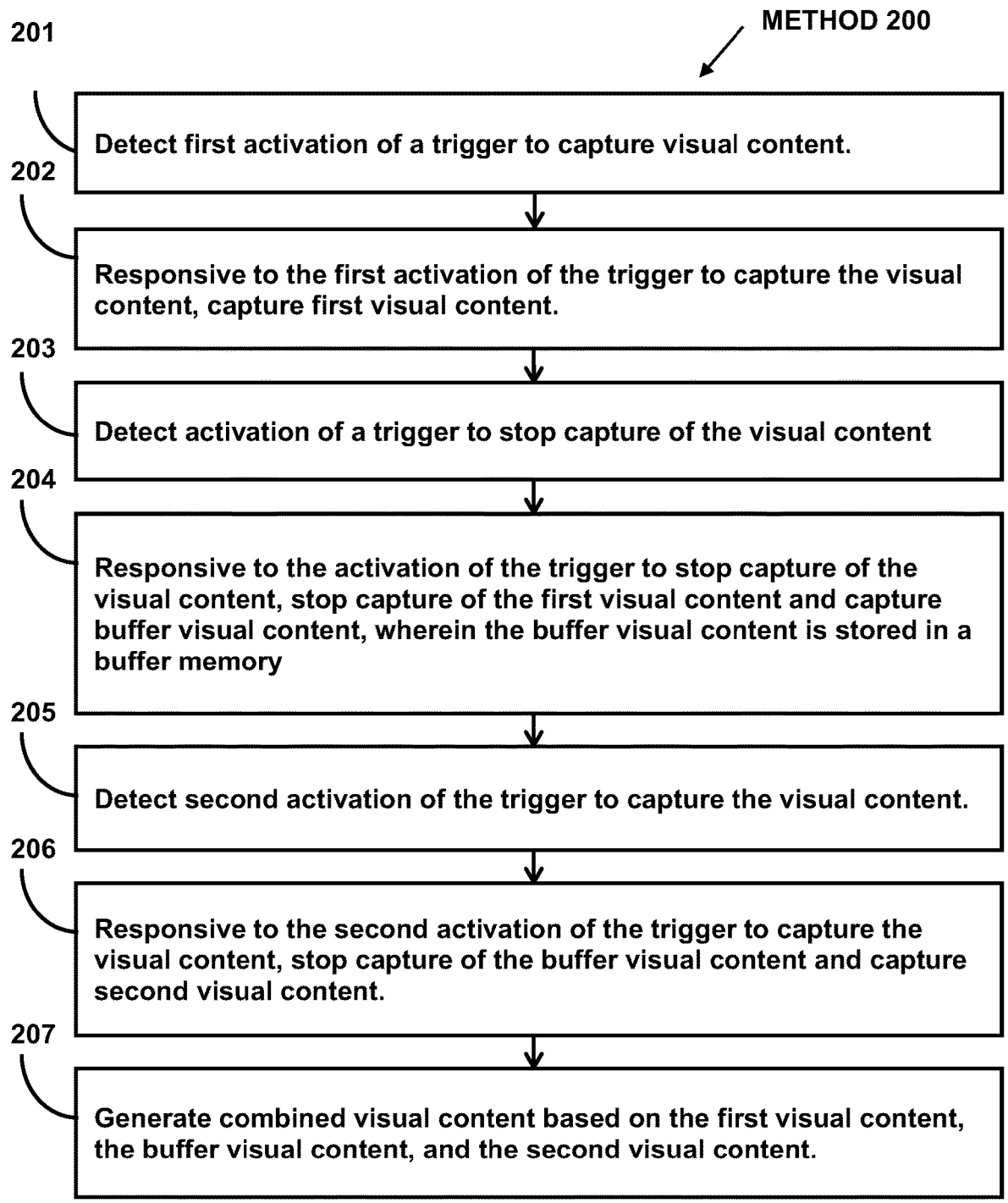
FIG. 2 illustrates an example method for reducing gaps between captures.

FIG. 2 illustrates method 200 for reduce gaps between captures. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include a housing. The housing may carry one or more of an image sensor, an optical element, a buffer memory, and/or other components. The optical element may guide light within a field of view to the image sensor. The image sensor may generate a visual output signal conveying visual information based on light that becomes incident thereon. The visual information may define visual content. The buffer memory may provide temporary information storage.

At operation 201, first activation of a trigger to capture the visual content may be detected. In some implementation, operation 201 may be performed by a processor component the same as or similar to the trigger component 102 (Shown in FIG. 1 and described herein).

At operation 202, responsive to the first activation of the trigger to capture the visual content, first visual content may be captured based on the visual information conveyed by the visual output signal. In some implementations, operation 202 may be performed by a processor component the same as or similar to the capture component 104 (Shown in FIG. 1 and described herein).

At operation 203, activation of a trigger to stop capture of the visual content may be detected. In some implementations, operation 203 may be performed by a processor component the same as or similar to trigger component 102 (Shown in FIG. 1 and described herein).

At operation 204, responsive to the activation of the trigger to stop capture of the visual content, capture of the first visual content may be stopped and buffer visual content may be captured based on the visual information conveyed by the visual output signal. The buffer visual content may be stored in the buffer memory. In some implementations, operation 204 may be performed by a processor component the same as or similar to the capture component 104 (Shown in FIG. 1 and described herein).

At operation 205, second activation of the trigger to capture the visual content may be detected. In some implementations, operation 205 may be performed by a processor component the same as or similar to the trigger component 102 (Shown in FIG. 1 and described herein).

At operation 206, responsive to the second activation of the trigger to capture the visual content, capture of the buffer visual content may be stopped and second visual content may be captured based on the visual information conveyed by the visual output signal. In some implementations, operation 206 may be performed by a processor component the same as or similar to the capture component 104 (Shown in FIG. 1 and described herein).

At operation 207, combined visual content may be generated based on the first visual content, the buffer visual content, and the second visual content. In some implementations, operation 207 may be performed by a processor component the same as or similar to the combining component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for reducing gaps between content captures, the system comprising:
   one or more physical processors configured by machine-readable instructions to:
      obtain first content captured by an image capture device during a first capture duration;
      obtain second content captured by the image capture device during a second capture duration;
      obtain buffer content captured by the image capture device during a buffer capture duration, the buffer capture duration being between the first capture duration and the second capture duration; and
      generate combined content based on the first content, the buffer content, and the second content responsive to the buffer capture duration not exceeding a maximum buffer capture duration.

2. The system of claim 1, wherein the buffer content provides continuity between the first content and the second content within the combined content.

3. The system of claim 1, wherein the buffer content is captured by the image capture device responsive to activation of a trigger to stop capture of the first content.

4. The system of claim 3, wherein the image capture device includes a display configured to visually present information, and a buffer capture element is presented on the display during capture of the buffer content by the image capture device, the buffer capture element indicating capture of the buffer content after the activation of the trigger to stop capture of the first content.

5. The system device of claim 4, wherein the buffer capture element is removed from presentation on the display based on a trigger to capture the second content not being activated within the maximum buffer capture duration after the activation of the trigger to stop capture of the first content.

6. The system of claim 3, wherein the trigger to stop capture of the first content is activated based on user interaction with a physical button or a virtual button of the image capture device.

7. The system of claim 3, wherein the trigger to stop capture of the first content is activated based on a voice command.

8. The system of claim 3, wherein the trigger to stop capture of the first content is activated based on motion of the image capture device and/or the content captured by the image capture device.

9. The system of claim 1, wherein the combined content is generated by appending the buffer content to an end of the first content and a start of the second content.

10. A method for reducing gaps between content captures, the method performed by a computing system including one or more processors, the method comprising:
   obtaining, by the computing system, first content captured by an image capture device during a first capture duration;
   obtaining, by the computing system, second content captured by the image capture device during a second capture duration;
   obtaining, by the computing system, buffer content captured by the image capture device during a buffer capture duration, the buffer capture duration being between the first capture duration and the second capture duration; and
   generating, by the computing system, combined content based on the first content, the buffer content, and the second content responsive to the buffer capture duration not exceeding a maximum buffer capture duration.

11. The method of claim 10, wherein the buffer content provides continuity between the first content and the second content within the combined content.

12. The method of claim 10, wherein the buffer content is captured by the image capture device responsive to activation of a trigger to stop capture of the first content.

13. The method of claim 12, wherein the image capture device includes a display configured to visually present information, and a buffer capture element is presented on the display during capture of the buffer content by the image capture device, the buffer capture element indicating capture of the buffer content after the activation of the trigger to stop capture of the first content.

14. The method of claim 13, wherein the buffer capture element is removed from presentation on the display based on a trigger to capture the second content not being activated within the maximum buffer capture duration after the activation of the trigger to stop capture of the first content.

15. The method of claim 12, wherein the trigger to stop capture of the first content is activated based on user interaction with a physical button or a virtual button of the image capture device.

16. The method of claim 12, wherein the trigger to stop capture of the first content is activated based on a voice command.

17. The method of claim 12, wherein the trigger to stop capture of the first content is activated based on motion of the image capture device and/or the content captured by the image capture device.

18. The method of claim 10, wherein the combined content is generated by appending the buffer content to an end of the first content and a start of the second content.

19. A system for reducing gaps between content captures, the system comprising:
   one or more physical processors configured by machine-readable instructions to:
      obtain first content captured by an image capture device during a first capture duration;
      obtain second content captured by the image capture device during a second capture duration;
      obtain buffer content captured by the image capture device during a buffer capture duration, the buffer capture duration being between the first capture duration and the second capture duration, wherein the buffer content is captured by the image capture device responsive to activation of a trigger to stop capture of the first content; and
      generate combined content based on the first content, the buffer content, and the second content responsive to the buffer capture duration not exceeding a maximum buffer capture duration, wherein the buffer content provides continuity between the first content and the second content within the combined content.

20. The system of claim 19, wherein:
   the image capture device includes a display configured to visually present information;
   a buffer capture element is presented on the display during capture of the buffer content by the image capture device, the buffer capture element indicating capture of the buffer content after the activation of the trigger to stop capture of the first content; and
   the buffer capture element is removed from presentation on the display based on a trigger to capture the second content not being activated within the maximum buffer capture duration after the activation of the trigger to stop capture of the first content.

* * * * *